United States Patent
Beltramin et al.

(10) Patent No.: US 12,345,557 B2
(45) Date of Patent: Jul. 1, 2025

(54) GEAR CASE FLUID SENSOR

(71) Applicant: Progress Rail Locomotive Inc., LaGrange, IL (US)

(72) Inventors: Sidarta Beltramin, Curitiba (BR); Mateus Augusto Oro Mikowski, Curitiba (BR); Luiz De Carvalho, Curitiba (BR); Rafael Grott de Carvalho, Curitiba (BR)

(73) Assignee: Progress Rail Locomotive Inc., LaGrange, IL (US)

( * ) Notice: Subject to any disclaimer, the term of this patent is extended or adjusted under 35 U.S.C. 154(b) by 906 days.

(21) Appl. No.: 17/496,518

(22) Filed: Oct. 7, 2021

(65) Prior Publication Data

US 2023/0113394 A1    Apr. 13, 2023

(51) Int. Cl.
  *G01F 23/26* (2022.01)
  *B61C 17/08* (2006.01)
  *G01F 23/263* (2022.01)

(52) U.S. Cl.
  CPC ............ *G01F 23/268* (2013.01); *B61C 17/08* (2013.01); *G01F 23/266* (2013.01)

(58) Field of Classification Search
  CPC .............................. G01F 23/268; B61C 17/08
  See application file for complete search history.

(56) References Cited

U.S. PATENT DOCUMENTS

| | | | |
|---|---|---|---|
| 7,188,521 B2 * | 3/2007 | Fling | G01F 23/543 73/322 |
| 10,107,671 B2 | 10/2018 | Niemann et al. | |
| 10,345,196 B2 | 7/2019 | Worden et al. | |
| 2007/0163534 A1 * | 7/2007 | Ketelhohn | G01F 23/268 73/304 C |
| 2016/0018381 A1 * | 1/2016 | Potyrailo | G01N 27/026 324/633 |
| 2016/0018382 A1 | 1/2016 | Worden et al. | |

FOREIGN PATENT DOCUMENTS

| | | |
|---|---|---|
| CN | 205483182 U | 8/2016 |
| JP | 2019095301 A | 6/2019 |

* cited by examiner

*Primary Examiner* — Robert J McCarry, Jr.

(57) ABSTRACT

A fluid level sensor is disclosed. The fluid level sensor has a frame which includes a hollow coupling component that attaches to a fluid drain of a gear case of a locomotive. A lug is insertable into the hollow coupling component that has a first connection end, and an elongated flexible sensor blade is attached to the lug. The flexible sensor blade is inserted into the gear case and used to measure a fluid level of a fluid in the gear case. The fluid level sensor also has a connector having a second connection end attached to the first connection end and a third connection end. A cover is attached to the frame, and the cover has a fourth connection end inside of an aperture of the cover, and the fourth connection end is attached to the third connection end.

20 Claims, 8 Drawing Sheets

GEAR CASE FLUID SENSOR

TECHNICAL FIELD

The present disclosure generally relates to a sensor, and more particularly, the present disclosure pertains to a fluid level sensor used in the transportation industry.

BACKGROUND

A drive train of a locomotive may include a gear case that surrounds a gear wheel, and the gear case has a reservoir for holding a fluid lubricant. The gear wheel moves through the reservoir to lubricate the gear wheel and any pinion or other gears that interact with the gear wheel. Due to design characteristics, the gear case is often sealed to prevent any leakage from the reservoir or the gear case. However, due to harsh environmental or operational conditions of the locomotive, such as large differences in temperature, humid environments, dry environments, changes in vibratory state, or built up of dirt or grime buildup, the case can become damaged, or the seals begin to leak causing the lubrication fluid to drain from the gear case. In unnoticed, the wheel gear/pinion gear interface can become stuck, causing drive train failure or a potential derailment event.

U.S. Pat. No. 10,598,650 relates to sensors measuring an operative condition of a machine. A capacitive oil sensor measures the transmission oil level in a traction motor transmission. The oil sensor can be attached into the traction motor transmission assembly.

While effective, there remains a need for improved fluid level sensors for locomotives used in high wear applications, such as the transportation industry.

SUMMARY

In accordance with the present disclosure, a fluid level sensor is disclosed. The fluid level sensor has a frame which includes a hollow coupling component that attaches to a fluid drain of a gear case of a locomotive. A lug is insertable into the hollow coupling component that has a first connection end, and an elongated flexible sensor blade is attached to the lug at a trailing end of the flexible sensor blade. The flexible sensor blade is inserted into the gear case and used to measure a fluid level of a fluid in the gear case. The fluid level sensor also has a connector having a second connection end attached to the first connection end and a third connection end. A cover is attached to the frame, and the cover has a fourth connection end inside of an aperture of the cover, and the fourth connection end is attached to the third connection end.

In accordance with another aspect of the present disclosure, a drive train of a locomotive is disclosed. The drive train has a traction motor that drives a pinion gear, and a gear wheel that engages the pinion gear at a gear mesh. The pinion gear rotates the gear wheel when driven by the traction motor. A gear case surrounds the gear wheel and has a reservoir holding a lubrication fluid, a lubrication fluid drain, and a lubrication fluid level sensor. The lubrication fluid level sensor has a frame which includes a hollow coupling component that attaches to the lubrication fluid drain of the gear case. A lug is insertable into the hollow coupling component that has a first connection end, and an elongated flexible sensor blade is attached to the lug at a trailing end of the flexible sensor blade. The flexible sensor blade is inserted into the gear case and used to measure a fluid level of the lubrication fluid in the gear case. The lubrication fluid level sensor also has a connector having a second connection end attached to the first connection end and a third connection end. A cover is attached to the frame, and the cover has a fourth connection end inside of an aperture of the cover, and the fourth connection end is attached to the third connection end.

In accordance with a further aspect of the present disclosure, a method of attaching a fluid level sensor to a gear case of a locomotive is disclosed. The method includes attaching a hollow coupling component of a frame of the fluid level sensor to a fluid drain of the gear case. The method further includes inserting an elongated flexible sensor blade of the fluid level sensor, that is attached at a trailing end of the flexible sensor blade to a lug of the fluid level sensor, through the hollow coupling component into the gear case. When inserted, the lug is inside of the hollow coupling component. The lug has a first connection end positioned away from the gear case, and the flexible sensor blade is used to measure a fluid level of a fluid in the gear case. Additionally, the method included attaching a connector of the fluid level sensor to the first connection end of the lug at a second connection end of the connector and attaching a cover of the fluid level sensor to the frame. The cover has a fourth connection end inside of an aperture of the cover, and the fourth connection end attaching to a third connection end of the connector.

These and other aspects and features of the present disclosure will be more readily understood when read in conjunction with the accompanying drawings.

DETAILED DESCRIPTION

Figure 1:
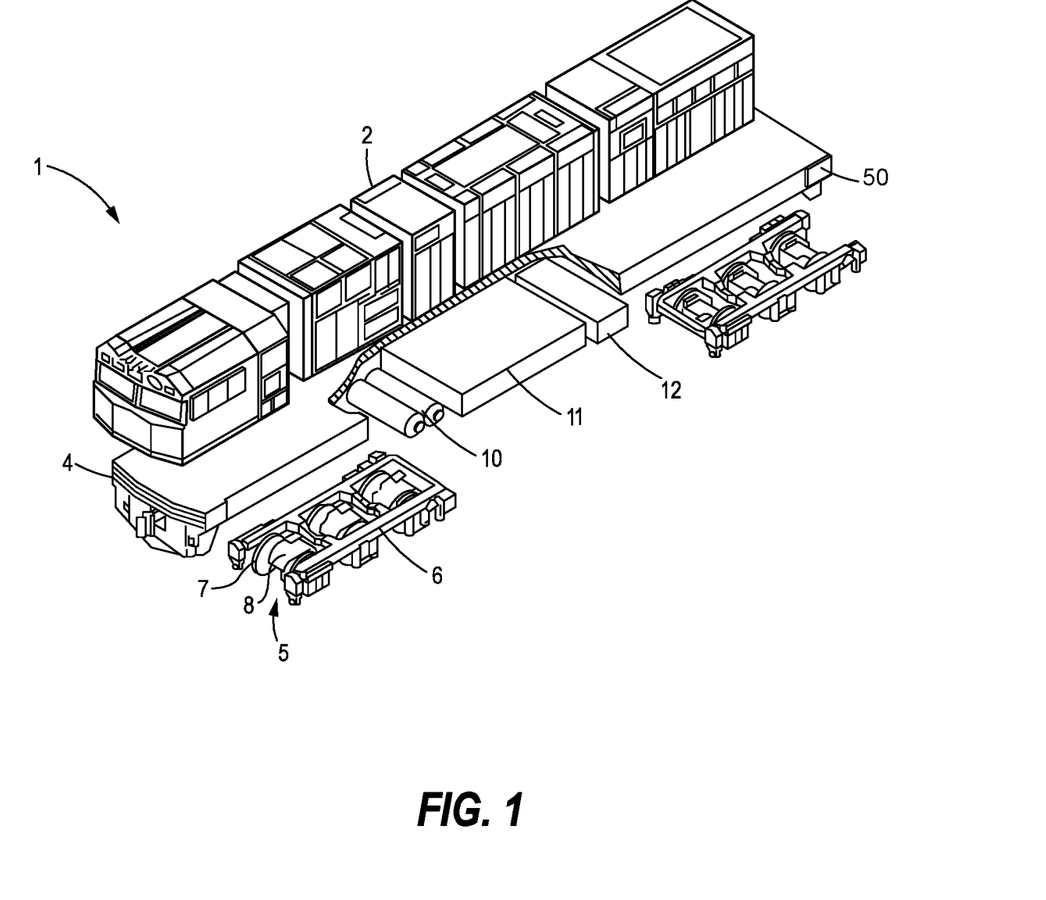
FIG. 1 is an exploded view of an exemplary locomotive, in accordance with the present disclosure.

Referring to FIG. 1, a locomotive 1, such as a heavy haul locomotive, used in the transportation industry, is shown. The locomotive 1 is capable of carrying a payload, such as self-propelled vehicles, or used to pull or push railroad cars used for the carrying of cargo or passengers on a rail transport system.

The locomotive 1 generally includes a car body 2 supported on a locomotive frame 4. Supporting the locomotive frame 4 on the tracks (not shown) of a railway or railroad is one or more trucks 5, or elastic elements based on small frames 6 containing the necessary running gear with sprung wheelsets 7 and a traction motor 8. Wheelsets 7 comprise a pair of wheels semi-permanently mounted on an axle 9 (FIG. 2) and designed for transmitting traction and braking torque to the wheels via a traction gear (discussed below) and brake devices (not shown). The locomotive may further include air reservoirs 10, a fuel tank 11 for storing a fuel such as diesel or other liquid or gaseous fuel, and a battery compartment 12 for storing batteries.

Figure 2:
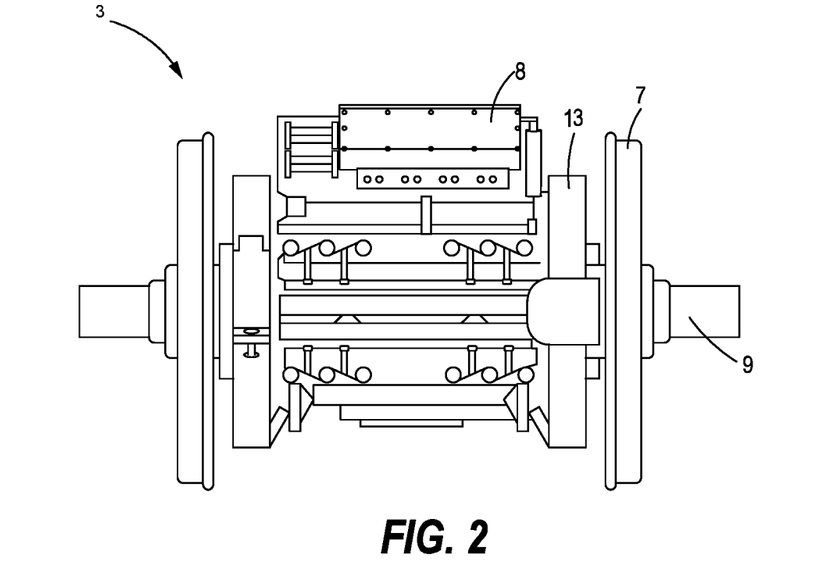
FIG. 2 is an exemplary drive train of a locomotive, in accordance with the present disclosure.

As best shown in FIG. 2, a drive train 3 (or final drive) is shown in accordance with an exemplary embodiment of the present disclosure. The drive train 3 is supported on the truck 5 and includes the traction motor 8, a pinion gear (not shown, such as a 15 teeth pinion gear), a gear wheel 42 (FIGS. 6-7, such as a 95 teeth gear wheel), and a gear case 13. The pinion gear and the gear wheel engaging at a gear mesh (not shown). During operation of the drive train 3, the traction motor 8 drives the pinion gear by rotating an axle (not shown) coupled to the pinion gear about an axis of rotation (not shown). The pinion gear may be rotated in a counterclockwise, or clockwise, direction, and due to the engagement at the gear mesh, the pinion gear rotates the gear wheel 42 in a direction opposite of the direction of rotation of the pinion gear. The gear wheel 42 is coupled to the axle 9 that rotates with the gear wheel 42. The axle 9 is coupled to the wheelset 7 that are rotated with the axle 9. The wheel engages a surface (not shown, e.g., rails or tracks) to move the locomotive 1.

The gear case 13 surrounds and protects the gear wheel 42 and includes a reservoir 47 (FIG. 7) that holds a lubrication fluid, such as petroleum or synthetic oil or grease. The gear wheel 42 is rotated in the gear case 13 and rotated into the reservoir 47 to lubricate the gear wheel, the interface, gear mesh, and the pinion gear to increase efficiency and cool the interface. The gear case 13 has a fluid level sensor 14, or lubrication fluid level sensor, that attaches to a fluid drain 15 (FIGS. 6-7), or lubrication fluid drain, of the gear case 13. The fluid level sensor 14 may be removed to drain the lubrication fluid through the fluid drain 15.

Figure 3:
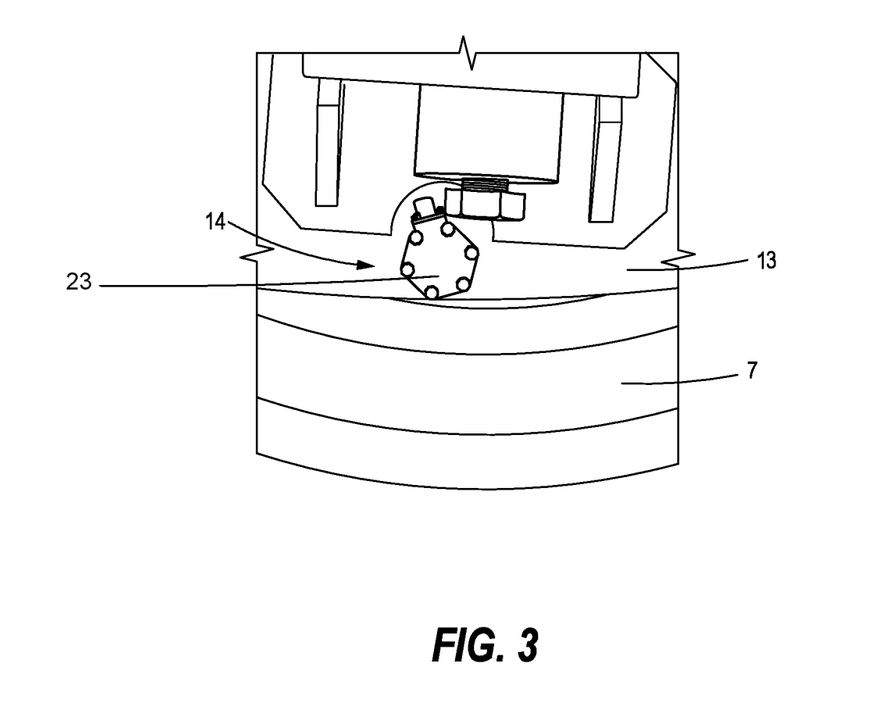
FIG. 3 is a partial view of the drive train of FIG. 2 showing an exemplary fluid level senor, in accordance with the present disclosure.
Figure 4:
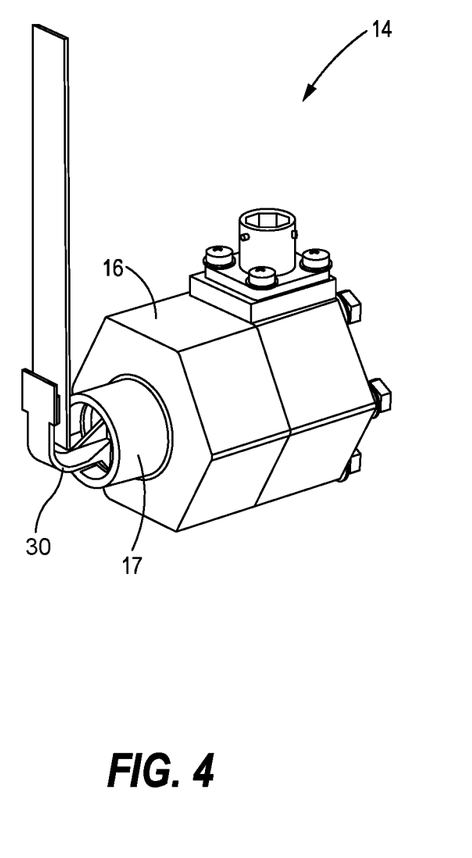
FIG. 4 is perspective view of the fluid level sensor of FIG. 3, in accordance with the present disclosure.
Figure 5:
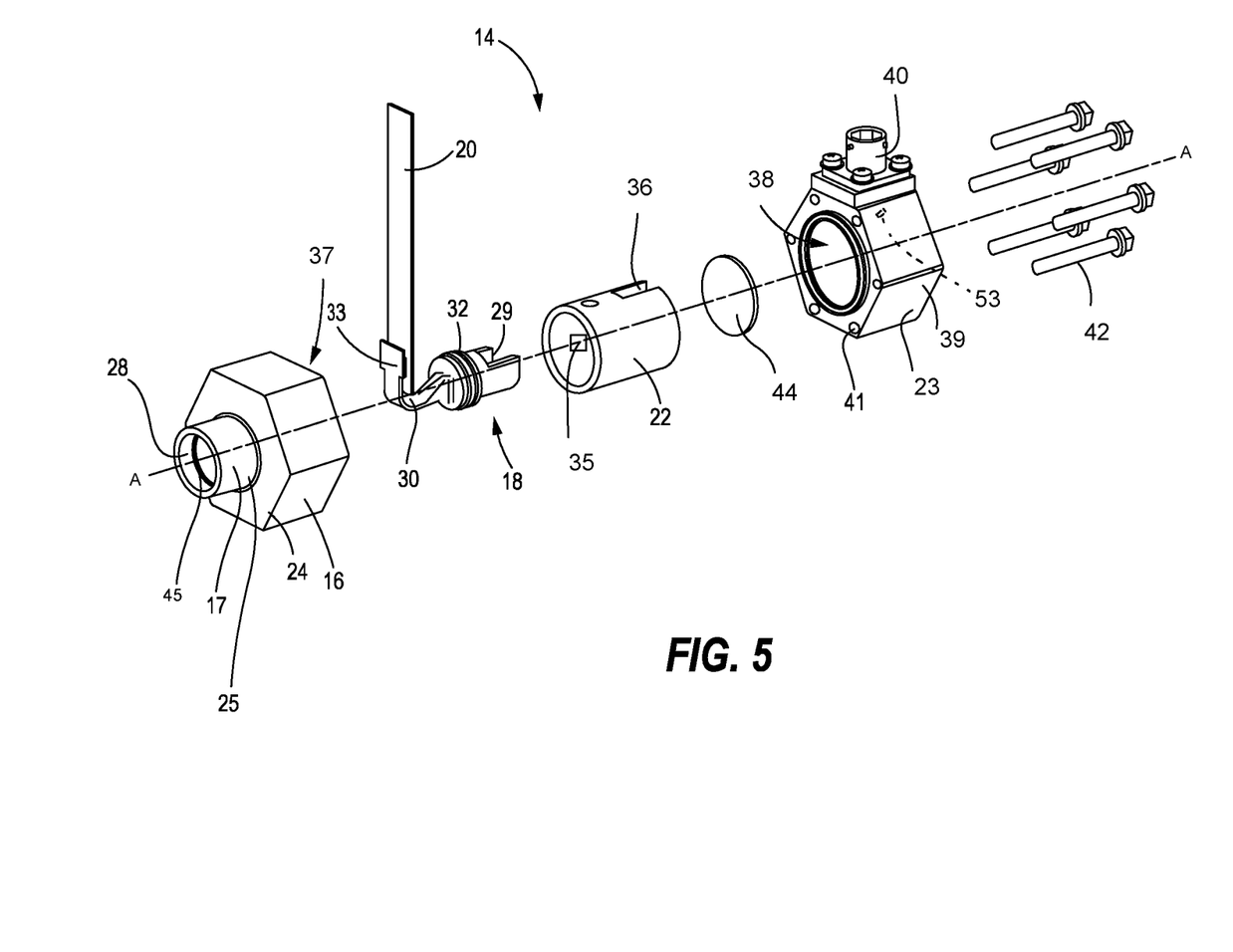
FIG. 5 is an exploded view of the fluid level sensor of FIG. 3, in accordance with the present disclosure.

As best shown in FIG. 3, the fluid level sensor 14 is attached to the fluid drain 15 of the gear case 13. The fluid level sensor 14, or lubrication fluid level sensor is depicted in FIGS. 4-5 and includes a frame 16 having a hollow coupling component 17, a lug 18, an elongated flexible sensor blade 20, a connector 22, and a cover 23.

The frame 16 of the fluid level sensor 14 has a frame body 24 and a hollow coupling component 17. The frame body may me made of metal, plastic, wood, or a synthetic material. The frame body 24, in the FIG. 5 embodiment is a hexagonal prism, but in another exemplary embodiment, may be a cylindrical, rectangular, cubed, or triangular prism. The hollow coupling component 17, in one exemplary embodiment, is threaded on its outside surface 25 to allow the frame 16 to be screwed into complimentary threads on an inside surface 27 (FIG. 7), or mating surface, of the of the cylindrical fluid drain 15 for attachment, but in other exemplary embodiments, the hollow coupling component is attached into the fluid drain 15 by other means, such as welding, adhesive, soldering, riveting or any other attachment means capable of making a fluid seal between the outside surface 25 of the hollow coupling component 17 and the inside surface 27 of the fluid drain 15. Further, the hollow coupling component 17 is depicted as having a hollow cylindrical shape, but may be hollow rectangular shape, or any other tubular shape that is complimentary in shape, to fit into, and having a slightly smaller diameter than, the fluid drain 15. The hollow coupling component further includes a through passage 28 allowing passage from outside of the frame 16 into the inside of the gear case 13. The center of the through passage 28 defining the center axis A-A of the fluid level sensor 14.

The lug 18 has a first connection end 29, an arm end 30, and a seal 32. When the hollow coupling component 17 is attached to the fluid drain 15, the lug is situated inside of the hollow coupling component 17, with the arm end 30 extending out of the hollow coupling component 17 parallel to the center axis A-A into the gear case 13. The arm end may further have an attachment portion 33 for attaching the flexible sensor blade 20, the attachment portion is perpendicular to the arm end, or the center axis A-A. The seal 32 of the lug may be a rubber, or other material, seal ring, or O-ring wrapping around the circumference of the lug 18 to prevent the fluid, or lubrication fluid, from traveling from the gear case 13 around lug 18 and through the through passage 28 of the hollow coupling component 17 into the frame 16 when the lug 18 is inserted into the hollow coupling component 17.

The flexible sensor blade 20 is an elongated rectangular shape for measuring a fluid level of the lubrication fluid inside of the reservoir 47 of the gear case 13. In one exemplary embodiment, the flexible sensor blade 20 is a capacitance sensor or a vibration sensor, for measuring the fluid level inside of the gear case 13. The flexible sensor blade 20 measures the fluid level and transmits a fluid level data signal from the flexible sensor blade 20 to the first connection end 29 of the lug 20. The flexible sensor blade 20 have a direct electrical, or other transmission means, connection with the first connection end, or the lug 18 and flexible sensor blade 20 are a single component.

In another exemplary embodiment, the flexible sensor blade 20 is a Printed Circuit Board (PCB) having a capacitance sensor or vibration sensor for measuring the lubrication fluid level inside of the gear case 13, and/or a temperature sensor for measuring a temperature of the lubrication fluid level inside of the gear case 13. Various types of measurements may be obtained by the flexible sensor blade 20, with some non-limiting examples including a capacitance of the fluid, a temperature of the fluid, a conduction of the fluid, a dielectric constant of the fluid, a dissipation factor of the fluid, an impedance of the fluid, a viscosity of the fluid, and/or the vibrations of a mechanical element, such as the vibrations from the wheel or pinion gears. A measurement may be obtained directly by the flexible sensor blade 20, or a designated measurement may be obtained using information provided by the sensor to calculate the designated measurement.

Figure 6:
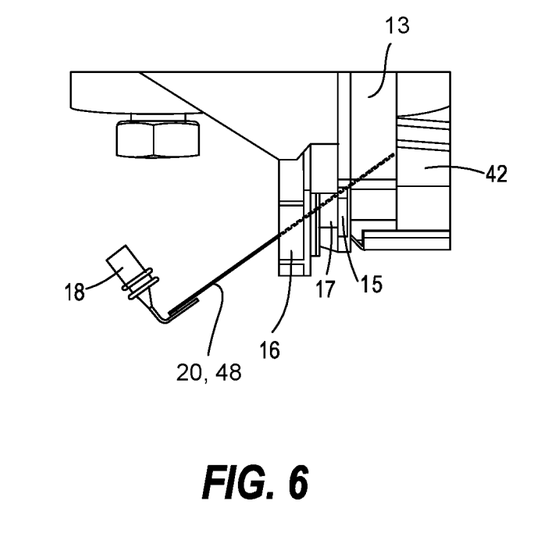
FIG. 6 is a partial view of the drive train of FIG. 2 showing a frame of the fluid level sensor attached to a fluid drain of a gear case of the drive train, in accordance with the present disclosure.
Figure 7:
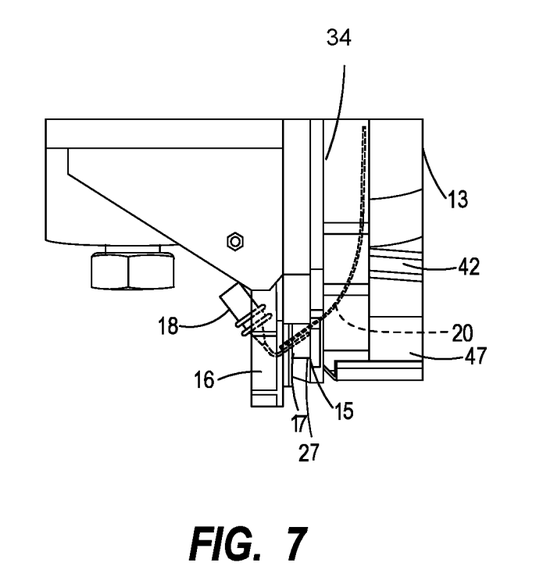
FIG. 7 is a partial view of the drive train of FIG. 2 showing a flexible sensor blade of the fluid level sensor inserted through the frame, in accordance with the present disclosure.

The flexible sensor blade 20, in one exemplary embodiment, measures the capacitance of the fluid, such as a lubrication fluid in the gear case 13. In this embodiment, the flexible sensor blade extends lengthwise between an interior wall 34 of the gear case 13 and the gear wheel 42, as shown in FIGS. 6-7. When the flexible sensor blade 20 is, or includes, a capacitance sensor, the flexible sensor blade 20 may further have an inner or measurement electrode and an outer or reference electrode (not shown). A capacitance of the fluid that exists with a space between the inner and outer measurement electrodes may be the fluid level measurement.

In a further exemplary embodiment, the flexible sensor blade 20 measures the vibratory state of the fluid in the gear case 13 to determine the fluid level. In this embodiment, alternatively or additionally, the flexible sensor blade may have an accelerometer to determine when the locomotive 1 is in motion to determine if the lubrication fluid is in motion, or flowing, inside of the gear case 13 to measure, or aide in the accuracy of the fluid level measurement, or determine any displacement of the fluid from the motion. The accelerometer may detect vibratory states experience by the mechanical elements, such as numerous shock and vibrations.

Figure 8:
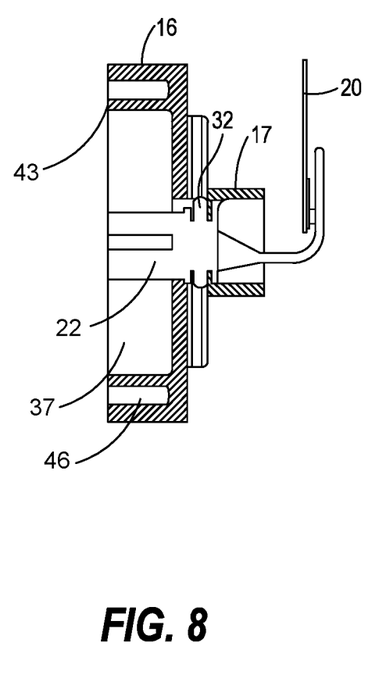
FIG. 8 is a sectional view of the fluid level sensor of FIG. 3, in accordance with the present disclosure.

The fluid level sensor 14 may further have the connector 22, the connector 22 having a second connection end 35 and a third connection end 36. The connector 22, as shown in the FIG. 5 embodiment, has a cylindrical shape, but rectangular or other shapes may be used in other exemplary embodiments. The connector 22, in the fully assembled fluid level sensor 14, is inside of an aperture of the frame 37 (best shown in FIG. 8) and an aperture of the cover 38 (best shown in FIG. 5), as to, when the cover 23 is attached to the frame 16, place the connector 22 completely inside of the apertures 37, 38. The second connection end is connected to the first connection end 29 of the lug 18.

The fluid level sensor 14 also has the cover 23, best shown in FIGS. 3 and 5, that is attached to the frame 16. The cover, in the FIG. 5 embodiment, has a complimentary shape to the frame, without the hollow coupling component, and instead having a solid wall opposite of the hollow coupling component 17 on the central axis A-A. In another exemplary embodiment, the cover 23 has a different shape than the frame 16, such as a rectangular, circular, or triangular prism, for example. The cover 23 further may have a fourth connection end 53 (FIG. 5) extending through a wall 39 of the cover 23 into the aperture of the cover 38. The fourth connection end 53 is connected to the third connection end 36 of the connector 33 and is communication through the wall 39 with a fifth connection end 40 of the cover 23. The fifth connection end 40 is located on top of the cover 40, as shown in FIG. 5. The cover may include one or more pass through holes 41 through the wall 39 of the cover 39, each of the pass through holes 41 receiving a fastener 42. The fasteners 42 passing through the pass-through holes 41 and securing to one or more securing holes 46 (FIG. 8) located on a back outer circumference of the frame 43 (FIG. 8), allowing for the cover 23 to be attached to, or secured to, the frame 16. The fasteners may be screws, bolts, such as M4 bolts, or any other object capable of attaching the cover 23 to the frame 16. In another exemplary embodiment, the cover 23 is attached to the frame 16 by other attachment means, such as adhesive, welding, screwing by threads, or the like.

In the FIG. 5 embodiment, the fluid level sensor 14 has a biasing member 44. The biasing member is situated between a back wall of the aperture of the cover 38 and the connector 22. The biasing member 22 may be a piece of foam, silicone, a spring, or any other object configured to apply a biasing force against the connector 22. The biasing force is transferred from the connector 22 and applied to the lug 18. This biasing force pushes the lug against a mechanical stop 45. The mechanical stop prevents the lug 18 from traveling completely through the hollow coupling component 17 into the gear case 13 when the lug 18 is inserted into the hollow coupling component 16.

Figure 9:
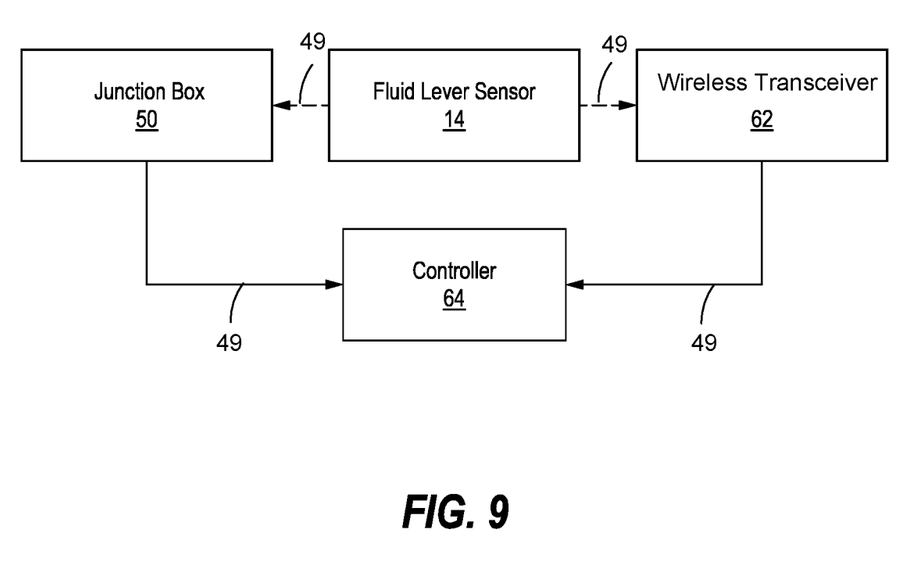
FIG. 9 is a schematic showing the fluid level sensor of FIG. 3 transmitting a fluid level data signal to a controller of the locomotive of FIG. 1.
Figure 10:
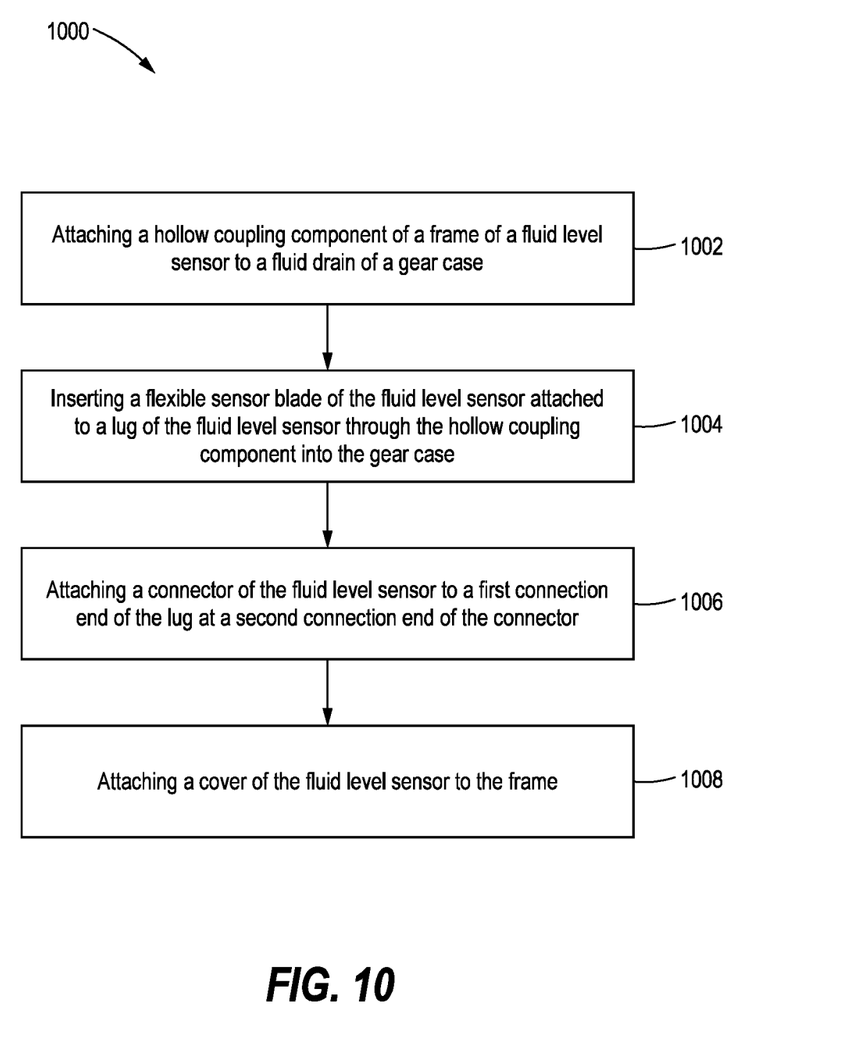
FIG. 10 is a flow chart illustrating a method of attaching a fluid level sensor to a gear case of a locomotive.

Each locomotive 1 may have one or more trucks 5 supporting the locomotive frame 4. Each truck 5 may have one or more drive trains 3, and each drive train 3 having the traction motor 8, wheelset 7, axle 9, pinion gear, and gear wheel 42 with accompanying gear case 13. Each gear case 13 has their own fluid level sensor 14. As best shown in FIG. 9, each cover 23 of each of the fluid level sensors 14, attached to each of the aforementioned gear cases 13, has the fifth connection end 40 on a circumferential surface, or the top surface, of the cover 23, and after measuring the fluid level, the flexible sensor blades 20 transmits the fluid level data signal 49 from the flexible sensor blade 20 to the first connection end 29, the second connection end 35, the third connection end 36, the fourth connection end 39, and finally the fifth connection end 40. In one exemplary embodiment, a wireless transceiver 62 is attached to the fifth connection 40 and sends the fluid level data signal to a controller 64 to determine the fluid level of each of the gear cases 13. The controller 64 may be a computer processor, and receives the fluid level data signals 49 from each of the fluid level sensors 14 to determine if the fluid level is below a level required for operation of the traction motor 8 on each of the drive trains 3.

In another exemplary embodiment, each of the fluid level sensors 14 connected to each of the gear cases 13 is connected to a junction box 50 by a wire, or other physical means of sending electromagnetic or electric current fluid level data signals 49, at the fifth connection end 40 of each of the fluid level sensors 14. In this embodiment, each flexible sensor blades 20 of each of the fluid level sensors 14, makes the fluid level measurement in each of their respective gear cases 13, and sends the fluid level data signal 49 from their flexible sensor blades 20 to the respective first connection ends 29, second connection ends 35, third connection ends 36, fourth connection ends 39, fifth connection ends 40, and finally to the junction box 50. The fluid level data signals are then sent from the junction box 50 to the controller, and the controller determining a fluid level of each of the gear cases 13 based on the fluid level data signals 49. In further exemplary embodiments, when the flexible sensor blades 20 have temperature, accelerometer, capacitance, or vibratory sensors, as discussed above, measurements made using these sensors are sent to the controller 64 to determine the operating state of the drive train 3, either by the wireless transceiver 62, or wired connection to the junction box 50 and then to the controller 64.

INDUSTRIAL APPLICABILITY

In general, the teachings of the present disclosure may find applicability in many industries including, but not limited to, fluid level sensors. More specifically, the teachings of the present disclosure may find applicability in any industry using fluid level sensor, such as, but not limit to, in the transportation industry, or any industry of the like utilizing locomotives.

In accordance with the scope of the present disclosure, in one such operation it is desirable to measure the fluid level of a lubrication fluid inside of the gear case attached to the traction motor of the locomotive. When the drive train of a locomotive is fully constructed and operational, the opening edges engages the portions of the drive train along sealable interfaces. The case edges may couple to each other along a sealable interface. During operation of the drive train, however, the interfaces may become damaged or worn such that the interfaces are no longer sufficiently sealed. For example, when the drive train is part of a locomotive, the opening edges of the case edges may become worn, damaged, or separated such that the fluid is permitted to escape the reservoir.

Specifically, it is desirable to retrofit the locomotive by attaching the fluid level sensor to a fluid drain of the gear case without damaging the seals of the existing gear case, or drilling additional holes into, or disassembling, the existing gear case. Embodiments described herein may measure the amount of fluid in the gear case and determine if it has been reduced. Further, the present disclosure provides a method for attaching the fluid level sensor to the gear case of the locomotive without damaging or altering the gear case by attaching the fluid level sensor to the existing fluid drain of the gear case.

Turning not to FIG. 9, with continued reference to FIGS. 3-8, a flowchart illustrating an exemplary method 1000 of attaching a fluid level sensor 14 to a gear case 13 of a locomotive 1 is provided. At block 1002, a hollow coupling component 17 of a frame 16 of the fluid level sensor 14 is attached to a fluid drain 15 of the gear case 13. In one embodiment, the hollow coupling component 17 of the frame 16 is screwed into the fluid drain 15 of the gear case 13, as depicted in FIG. 6.

At block 1004, and further shown in FIG. 6, a flexible sensor blade 20 of the flexible sensor blade 14, attached to a lug 18 of the flexible sensor blade at a trailing end of the flexible sensor blade 48, is inserted through the hollow coupling component 17 into the gear case 13. The flexible sensor blade 20 is completely inserted through the hollow coupling component 17 prior to inserting the lug 18 into the hollow coupling component 17. The lug 18 has a first connection end 29 positioned away from the gear case 13, and the flexible sensor blade 20 is configured to measure a fluid level of a fluid in the gear case 13. As shown in FIG. 7, the flexible sensor blade 20 is positioned between the gear wheel 42 and an interior wall of the gear case 34. Further shown in FIG. 7, the flexible sensor blade 20 is flexible, allowing it to bend when it come into contact with the gear case 34, and bend upwards to be inserted into the gear case 13.

At block 1006, a connector 22 of the fluid level sensor 14 is attached to the lug 18. Specifically, a first connection end 29 of the lug 18 is attached to a second connection end 35 of the connector 22. A cover 23 of the fluid level sensor 14, at block 1008, is then attached to the frame 16. A fourth connection end 53 of the cover 23 connecting with the third connection end 36 of the connector 22. The flexible sensor blade then making a measurement of the fluid level inside of the gear case 13 and sending a fluid level data signal from the flexible sensor blade 20 to the first connection end 29, to the second connection end 35, to the third connection end 36, to the fourth connection end 53, and finally to a fifth connection end 40 located on top of the cover 23.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A fluid level sensor, comprising:
a frame having a hollow coupling component configured to attach to a fluid drain of a gear case of a locomotive;
a lug insertable into the hollow coupling component having a first connection end;
an elongated flexible sensor blade attached to the lug at a trailing end of the flexible sensor blade, the flexible sensor blade configured to be inserted into the gear case and measure a fluid level of a fluid in the gear case;
a connector having a second connection end attached to the first connection end and a third connection end; and
a cover attached to the frame, the cover has a fourth connection end inside of an aperture of the cover, and the fourth connection end is attached to the third connection end.

2. The fluid level sensor of claim 1, in which the hollow coupling component is cylindrical and is threaded on an outside surface of the hollow coupling component, the fluid drain contains complimentary threads to the hollow coupling component on an interior mating face of the fluid drain, and the hollow coupling component is rotatably engaged to the fluid drain.

3. The fluid level sensor of claim 1 in which the connector is situated in an aperture of the frame and the aperture of the cover.

4. The fluid level sensor of claim 1, in which the cover has a fifth connection end on a circumferential surface of the cover.

5. The fluid level sensor of claim 4, in which after measuring the fluid level, the flexible sensor blade transmits a fluid level data signal from the flexible sensor blade to the first connection end, the second connection end, the third connection end, and the fourth connection end, and finally the fifth connection end.

6. The fluid level sensor of claim 1, in which the lug further has an arm end, and the trailing end of the flexible sensor blade is attached to the arm end of the lug.

7. The fluid level sensor of claim 6, in which the arm end of the lug extends through the hollow end of the coupling component into the gear case, the arm end further having an attachment portion, the attachment portion being perpendicular to the arm end, and the flexible sensor blade attached to and parallel with the attachment portion.

8. The fluid level sensor of claim 1, in which the lug has a seal configured to prevent fluid from traveling from the gear case around the lug and through the hollow coupling component.

9. The fluid level sensor of claim 1, in which the hollow coupling component has a mechanical stop to prevent the lug from traveling completely through the hollow coupling component into the gear case when the lug is inserted into the hollow coupling component.

10. The fluid level sensor of claim 9, further including a biasing member inside of the aperture of the cover, the biasing member applying a force onto the connector, and the connector in turn applying a force on the lug against the mechanical stop.

11. The fluid level sensor of claim 1, in which a wall of the cover has one or more pass through holes configured to allow one or more fasteners to pass through each of the one or more pass through holes, each of the one or more fasteners securing to one or more securing holes located on a back circumference of the frame to attach the cover to the frame.

12. The fluid level sensor of claim 1, in which the flexible sensor blade is a printed circuit board having a capacitive fluid level sensor or a vibration fluid level sensor.

13. The fluid level sensor of claim 12, in which the flexible sensor blade also includes a temperature sensor that is configured to measure the temperature of the fluid in the gear case.

14. A drive train of a locomotive, the drive train comprising:
  a traction motor configured to drive a pinion gear;
  a gear wheel engaging the pinion gear at a gear mesh, the pinion gear configured to rotate the wheel gear; and
  a gear case surrounding the gear wheel and having a reservoir holding a lubrication fluid, a lubrication fluid drain, and a lubrication fluid level sensor, the lubrication fluid level sensor comprising:
    a frame having a hollow coupling component configured to attach to the lubrication fluid drain;
    a lug insertable into the hollow coupling component having a first connection end;
    an elongated flexible sensor blade attached to the lug at a trailing end of the flexible sensor blade, the flexible sensor blade configured to be inserted through the lubrication fluid drain into the gear case and measure a fluid level of the lubrication fluid in the gear case;
    a connector having second connection end attached to the first connection end and a third connection end; and
    a cover attached to the frame, the cover has a fourth connection end inside of an aperture of the cover, and the fourth connection end is attached to the third connection end.

15. The drive train of claim 14, in which the cover of the lubrication fluid level sensor has a fifth connection end on a circumferential surface of the cover, and after measuring the fluid level, the flexible sensor blade transmits a fluid level data signal from the flexible sensor blade to the first connection end, the second connection end, the third connection end, and the fourth connection end, and finally the fifth connection end.

16. The drive train of claim 15, in which a wireless transceiver is attached to the fifth connection end of the lubrication fluid level sensor, the wireless transceiver sending the fluid level data signal to a controller, the controller determining a fluid level of the gear case.

17. The drive train of claim 15, in which the drive train has two or more traction motors, each of the two or more traction motors has the gear case with the lubrication fluid level sensor, each of the lubrication fluid level sensor having a wire running from the fifth connection end to a junction box.

18. The drive train of claim 17, in which a controller receives the fluid level data signal from each of the flexible sensor blades from each of the lubrication fluid level sensors, the controller determining a fluid level in each of the gear cases.

19. A method of attaching a fluid level sensor to a gear case of a locomotive, the method including:
  attaching a hollow coupling component of a frame of the fluid level sensor to a fluid drain of the gear case;
  inserting an elongated flexible sensor blade of the fluid level sensor attached at a trailing end to a lug of the fluid level sensor through the hollow coupling component into the gear case, the lug being inserted inside of the hollow coupling component, the lug having a first connection end positioned away from the gear case, and the flexible sensor blade configured to measure a fluid level of a fluid in the gear case;
  attaching a connector of the fluid level sensor to the first connection end of the lug at a second connection end of the connector;
  attaching a cover of the fluid level sensor to the frame, the cover having a fourth connection end inside of an aperture of the cover, and the fourth connection end attaching to a third connection end of the connector.

20. The method of claim 19, in which the flexible sensor blade is parallel with a gear wheel of the locomotive after being inserted into the gear case.

* * * * *